United States Patent

Müntnich et al.

Patent Number: 5,335,998
Date of Patent: Aug. 9, 1994

[54] AXIAL BEARING UNIT

[75] Inventors: Leo Müntnich, Aurachtal; Wilfried Soyka; Wolfgang Steinberger, both of Herzogenaurach, all of Fed. Rep. of Germany

[73] Assignee: Ina Walzlager Schaeffler KG, Fed. Rep. of Germany

[21] Appl. No.: 5,647

[22] Filed: Jan. 19, 1993

[30] Foreign Application Priority Data

Jan. 31, 1992 [DE] Fed. Rep. of Germany ... 9201121[U]

[51] Int. Cl.⁵ .................................................. F16C 33/58
[52] U.S. Cl. ........................................ 384/622; 384/620
[58] Field of Search ............... 384/609, 611, 615, 617, 384/618, 620, 621, 622

[56] References Cited

U.S. PATENT DOCUMENTS

| | | | |
|---|---|---|---|
| 780,409 | 1/1905 | Conway et al. | 384/615 |
| 4,336,972 | 6/1982 | Dagiel | 384/611 |
| 4,466,751 | 8/1984 | Higuchi | 384/618 X |
| 4,696,588 | 9/1987 | Tanaka et al. | 384/615 |
| 4,934,842 | 6/1990 | Premiski et al. | 384/620 X |
| 4,995,737 | 2/1991 | Moller et al. | 384/611 X |

*Primary Examiner*—Thomas R. Hannon
*Attorney, Agent, or Firm*—Bierman and Muserlian

[57] ABSTRACT

An axial beaing unit comprising two bearing discs (1, 2) with rolling elements (3) disposed therebetween, each of the bearing discs (1, 2) comprising an axially oriented cylindrical flange, which cylindrical flanges overlap each other in the axial direction, the flange of one of the bearing discs (1) being made as an overhanging flange (9) comprising a radially projecting end portion (3) at its free end (11), and the flange of the other bearing disc (2) being a retaining flange (10) comprising a retaining surface (14) facing the end portion (13), the end portion (13) engaging behind the retaining surface (14) so that the bearing discs are connected to each other secure against loss, characterized in that the radially projecting end portion (13) comprises several elastically yielding bosses (12) made without chip-removal and arranged spaced apart on the circumference of the end portion (13), which bosses (12) engage as a result of radial elastic relaxation behind the retaining surface (14).

7 Claims, 2 Drawing Sheets

AXIAL BEARING UNIT

STATE OF THE ART

Axial bearing units comprising two bearing discs with rolling elements disposed therebetween, each of the bearing discs comprising an axially oriented cylindrical flange, which cylindrical flanges overlap each other in an axial direction, the flange of one of the bearing discs being made as an overhanging flange comprising a radially projection end portion at its free end, and the flange of the other bearing disc being a retaining flange comprising a retaining surface facing said end portion, said end portion engaging behind said retaining surface so that the bearing discs are connected to each other secure against loss are known from EP-PS 0,153,662. The free ends of the retaining and the overhanging flange overlap each other and are both conical in shape so that the conical end portion of the retaining flange engages behind the conical retaining surface of the retaining flange. In this way, the two bearing discs are connected to each other secure against loss.

The manufacturing of such an axial bearing unit is, however, rather complicated because the free ends of the flanges have initially to be conically formed in a first step. Since the thus prefabricated bearing discs cannot be connected to each other, the entire axial length of the retaining flange has to be conically widened in a second step so that the retaining surface and the radially projecting end portion of the two bearing discs do not hinder each other during assembly. The completion of the axial bearing unit is done in a third step in which the conically widened retaining flange is redressed radially inwards so that the retaining surface and the radially projecting end portion engage behind each other. Such axial bearing units are thus expensive to manufacture and further, they have a larger design space requirement due to the design of the flanges.

OBJECTS OF THE INVENTION

It is an object of the invention to provide an axial bearing unit which is simple and inexpensive to manufacture, which saves design space, and in which the two bearing discs can be connected to each other secure against loss, in one single operation.

This and other objects and advantages of the invention will become obvious from the following detailed description.

THE INVENTION

The novel axial bearing unit of the invention comprising two bearing discs (1, 2) with rolling elements (3) disposed therebetween, each of the bearing discs (1, 2) comprising an axially oriented cylindrical flange, which cylindrical flanges overlap each other in the axial direction, the flange of one of the bearing discs (1) being made as an overhanging flange (9) comprising a radially projecting end portion (13) at its free end (11), and the flange of the other bearing disc (2) being a retaining flange (10) comprising a retaining surface (14) facing said end portion (13), said end portion (13) engaging behind said retaining surface (14) so that the bearing discs are connected to each other secure against loss, is characterized in that the radially projecting end portion (13) comprises several elastically yielding bosses (12) made without chip-removal and arranged spaced apart on the circumference of said end portion (13), which bosses (12) engage as a result of radial elastic relaxation behind the retaining surface (14).

The invention achieves its object by the fact that the radially projecting end portion comprises several elastically yielding bosses made without chip-removal and arranged spaces apart on its circumference, which bosses engage as a result of radial elastic relaxation behind the retaining surface.

During assembly of the two bearing discs of an axial bearing unit of this design, the bosses are at first pressed-in elastically. When the two bearing discs are assembled, the bosses expand by radial elastic relaxation and engage behind the retaining surface. The bosses cause the material of the overhanging flange to be displaced so that it is stretched in the peripheral direction with a simultaneous reduction of wall thickness. By this simple measure, the bosses are endowed with the desired elastic properties.

A particularly favorable axial bearing unit of the invention is that wherein the two bearing discs have central bore of different diameters. The smaller bore is defined by the overhanging flange and the larger bore is defined by the retaining flange. The bosses on the free end of the overhanging flange are oriented radially outwards and face the retaining surface which is formed by a conical widening of the retaining flange. This conical widening is made on the flange end facing the bearing disc so that the wall thickness of the retaining flange is not, or only slightly, reduced. This conical widening is made for example by material forming, preferably by stamping, so that it is perfectly centered and even. In operation, the two bearing discs of the axial bearing unit are loaded axially by the components which they serve to mount so that the bosses lift off from the conical widening and the bearing discs consequently rotate without mutual contact.

In another embodiment, a circumferential radial step is provided on the side of the overhanging flange facing the retaining flange. This step which is formed during the axial stretch-drawing of the free end of the flange, though not very pronounced in shape, still promotes the formation of the bosses.

In an axial top view of the free end of the overhanging flange, each boss may be constituted by a convexity which diminishes in the direction of the bearing disc comprising the overhanging flange. The axial depth and the angle of inclination of the convexity are matched with the conical widening of the retaining flange.

It can be favorable for reasons of lubrication that the overhanging flange comprises a recess between two neighboring bosses and to simplify assembly and optimize design space, the free end of the retaining flange may comprise a lead-in chamfer.

Referring now to the drawings.

Figure 1:
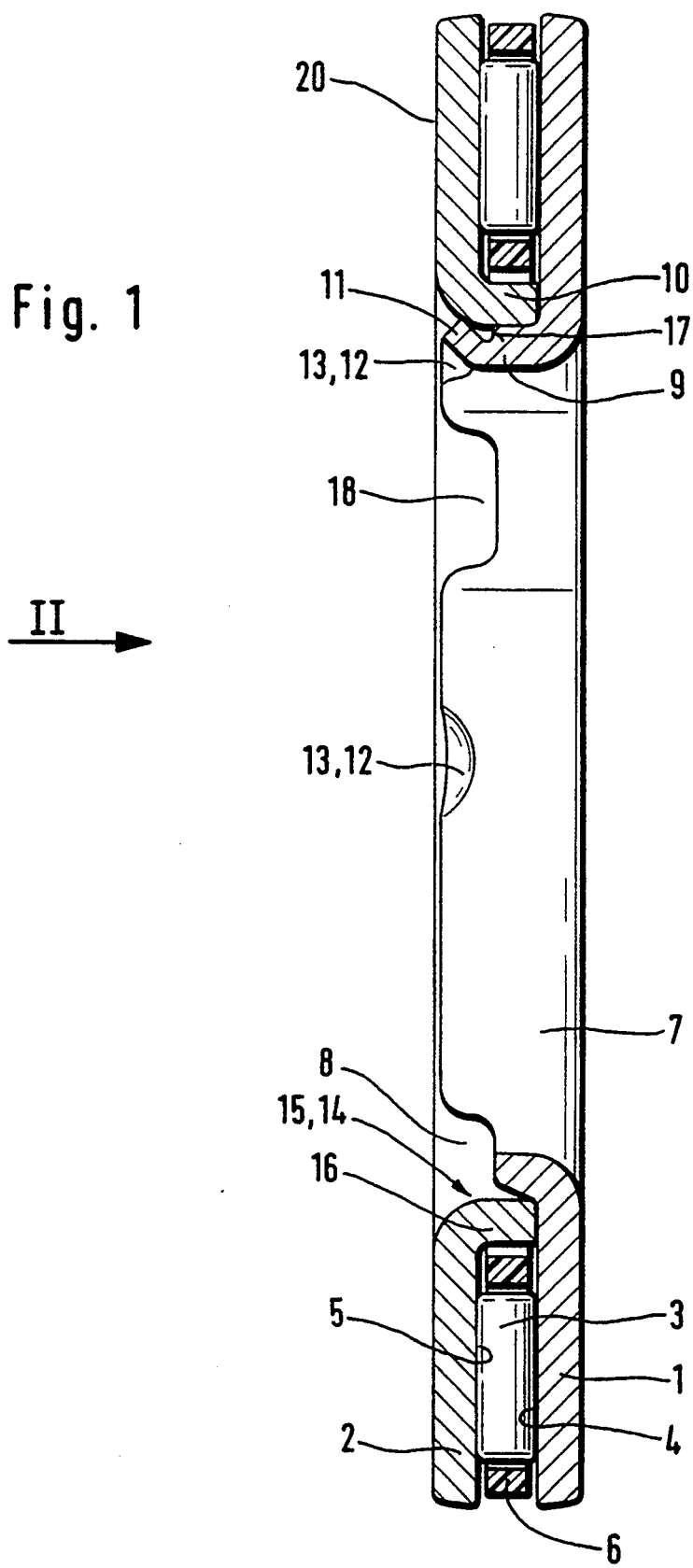
FIG. 1 is an enlarged embodiment of a longitudinal cross-section of an axial bearing unit of the invention taken along line I—I of FIG. 2.

FIG. 1 shows an axial bearing unit of the invention comprising two bearing discs 1, 2 and cylindrical rolling elements 3 disposed therebetween which roll on raceways 4, 5 of the bearing discs 1, 2. In this embodiment, the cylindrical rolling elements 3 are arranged in a rolling bearing cage 6. The bearing discs 1, 2 have central bores 7, 8 of different diameters and the smaller bore 7 is defined by the overhanging flange 9 formed on the bearing disc 1 and the larger bore 8 is defined by the retaining flange 10 formed on the bearing disc 2.

At its free end 11, the overhanging flange 9 comprises radially outwardly oriented bosses 12 spaced apart on its circumference and forming the radially projecting end portion 13. These bosses 12 engage behind the retaining surface 14 which is made as a conical widening 15 on the end 16 of the retaining flange 10 facing the bearing disc 2. In the region of the bosses 12, the overhanging flange 9 comprises a radial step 17 on its side facing the retaining flange 10.

Figure 2:
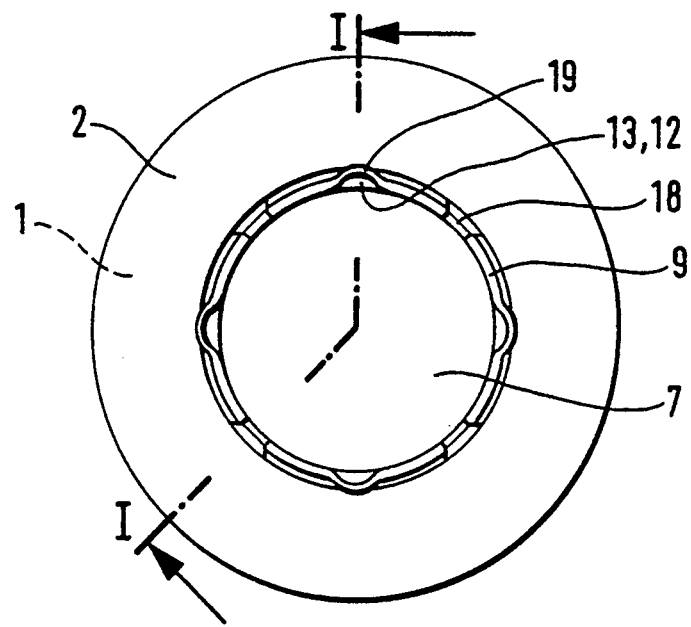
FIG. 2 is an axial top view II of the axial bearing unit of FIG. 1.

For reasons of lubrication, recesses 18 are provided on the overhanging flange 9 between two neighboring bosses 12. The axial view II of this axial bearing unit is shown in FIG. 2. From this representation, it becomes clear that the bosses 12 are formed by convexities 19 which diminish axially in the direction of the bearing disc 1 which comprises the overhanging flange 9. It can also be clearly seen in this representation that the wall thickness of the boss 12 is reduced as compared to the wall thickness of the overhanging flange 9.

Figure 3:
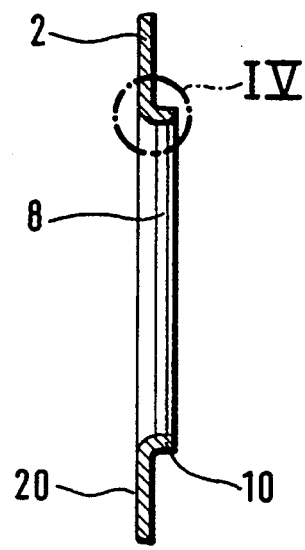
FIG. 3 is a longitudinal section through the bearing disc comprising the retaining flange.
Figure 4:
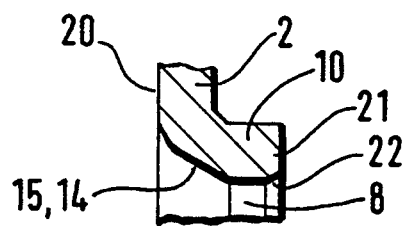
FIG. 4 is an enlargement of the portion identified at IV of the bearing disc of FIG. 3.

For the sake of clearness, the bearing disc 2 of FIG. 1 comprising the retaining flange 10 is represented separately in FIG. 3, while FIG. 4 shows an enlargement of the marked region IV. The conical widening 15 forming the retaining surface 14 is delimited on one side by the outer surface 20 of the bearing disc 2 and on the other side by the larger central bore 8. The widening 15 is made by material forming by stamping so that it is perfectly centered and even. In this way, it is assured that in the assembled operating position of the axial bearing unit, the bosses 12 of the one bearing disc 1 do not contact the conical widening 15 of the other bearing disc 2 behind which they engage. For simplifying assembly and optimizing design space, a lead-in chamfer 22 is provided on the free end 21 of the retaining flange 10.

During assembly of the two bearing discs 1, 2, the bosses 12 of the overhanging flange 9 are at first pre-tensioned radially inwards in the larger central bore 8 of the retaining flange 10 and relax elastically when they reach the region of the retaining surface 14. In this example of embodiment, the retaining flange and the overhanging flange 10, 9 are both arranged on the radially inner side of the bearing discs 1, 2.

Depending on the case of use, it is possible to provide the retaining flange and the overhanging flange 10, 9 on the radially outer side of the bearing discs 2, 1. Further, the retaining surface 14 of the retaining flange 10 can also be formed by a step-shaped shoulder in place of the widening 15 described above.

Various other modifications of the bearing unit of the invention may be made without departing from the spirit or scope thereof and it should be understood that the invention is intended to be limited only as defined in the appended claims.

What we claim is:

1. An axial bearing unit comprising two bearing discs (1, 2) with rolling elements (3) disposed therebetween, each of the bearing discs (1, 2) comprises an axially oriented cylindrical flange, which cylindrical flanges overlap each other in the axial direction, the flange of one of the bearing discs (1) being made as an overhanging flange (9) comprising a radially projecting end portion (13) at its free end (11), and the flange of the other bearing disc (2) being a retaining flange (10) comprising a retaining surface (14) facing said portion (13), said end portion (13) engaging behind said retaining surface (14) so that the bearing discs are connected to each other secure against loss, characterized in that the radially projecting end portion (13) comprises several elastically yielding bosses (12) made without chip-removal and arranged spaced apart on the circumference of said end portion (13), which bosses (12) engage as a result of radial elastic relaxation behind the retaining surface (14) which retaining surface (14) is made by a conical widening (15) on an end of the retaining flange (10) facing the bearing disc (2) by material forming.

2. An axial bearing of claim 1 wherein the bearing discs have central bores (7, 8) of different diameters, characterized in that the smaller bore (7) is defined by the overhanging flange (9), and the larger bore (8) is defined by the retaining flange (10), the bosses (12) formed on the overhanging flange (9) being oriented radially outwards, and an end (16) of the retaining flange (10) facing the bearing disc (2) comprises a conical widening (15) which forms the retaining surface (14) which is delimited by the axial outer surface (20) of this bearing disc (2).

3. An axial bearing unit of claim 2 wherein in the region of the bosses (12), the overhanging flange (9) comprises a radial step (17) on its side facing the retaining flange (10).

4. An axial bearing unit of claim 2 wherein in an axial top view of the free end (11) of the overhanging flange (9), each boss (12) is constituted by a convexity (19) which diminishes in the direction of the bearing disc (1) comprising the overhanging flange (9).

5. An axial bearing unit of claim 2 wherein the overhanging flange (9) comprises a recess (18) between two neighboring bosses (12).

6. An axial bearing unit of claim 2 wherein the free end (21) of the retaining flange (10) comprises a lead-in chamfer (22).

7. An axial bearing of claim 1 wherein the conical widening (15) is effected by stamping.

* * * * *